(12) United States Patent
Brazier

(10) Patent No.: US 6,904,986 B2
(45) Date of Patent: Jun. 14, 2005

(54) TERRAIN CONFORMING TRACK ASSEMBLY

(76) Inventor: Glen Brazier, 202 Cleveland Ave. E., Karlstad, MN (US) 56732-0239

( * ) Notice: Subject to any disclaimer, the term of this patent is extended or adjusted under 35 U.S.C. 154(b) by 0 days.

(21) Appl. No.: 10/348,156

(22) Filed: Jan. 21, 2003

(65) Prior Publication Data

US 2004/0140138 A1 Jul. 22, 2004

(51) Int. Cl.$^7$ .............................................. B62D 55/00
(52) U.S. Cl. ...................................... 180/9.21; 180/9.5
(58) Field of Search .................. 180/9.46, 9.1, 180/9.21, 9.28, 9.3, 9.5; 305/165, 178, 180, 187, 191

(56) References Cited

U.S. PATENT DOCUMENTS

| | | | | |
|---|---|---|---|---|
| RE32,442 E | * | 6/1987 | Satzler | 180/9.1 |
| 5,273,126 A | * | 12/1993 | Reed et al. | 180/9.21 |
| 5,343,960 A | * | 9/1994 | Gilbert | 172/823 |
| 6,247,547 B1 | * | 6/2001 | Lemke et al. | 180/9.5 |
| 6,283,562 B1 | * | 9/2001 | Tsubota et al. | 305/135 |
| 6,505,896 B1 | * | 1/2003 | Boivin et al. | 305/178 |
| 6,615,939 B1 | * | 9/2003 | Karales et al. | 180/9.26 |
| 6,644,426 B1 | * | 11/2003 | Larue | 180/9.1 |

* cited by examiner

*Primary Examiner*—Lesley D. Morris
*Assistant Examiner*—L. Lum
(74) *Attorney, Agent, or Firm*—D L Tschida

(57) ABSTRACT

An endless track assembly that mounts to a wheeled vehicle. The assembly provides 1) a track suspension having fixed or adjustable, independently biased sets of idler wheels to vary the track contour without affecting track tension, 2) an eccentric bearing housing at a drive sprocket controls track tension, 3) a contoured peripheral edge at the drive sprocket prevents ice and mud buildup, 4) rubber-coated, plastic idler wheels facilitate track movement, 5) a multi-vehicle compatible adapter mounting plate accommodates a variety of vehicles, 6) a rotation limited torsion coupler and/or rotation limiting coupler arms prevent track contact with the vehicle, 7) a locking steering arm coupler prevents loss of steering control, and 8) shaped track lugs and channels clear and direct debris away from the track suspension and drive assembly. The improved suspension particularly supports sets of idler wheels in pivotal relation to the track support frame and resiliently biases a pre-tensioned rocker arm that links adjacent suspension arms mounted to the adjoining idler wheels. Suspension arm movement induces expansion and contraction of tension springs coupled to the rocker arms to augments shape changes at the track contact surface to optimize traction and steering control.

26 Claims, 14 Drawing Sheets

TERRAIN CONFORMING TRACK ASSEMBLY

BACKGROUND OF THE INVENTION

The present invention relates to all terrain vehicles (ATV) and, in particular, to an improved endless track assembly that can be substituted for the drive wheels of wheeled ATV's or any two, four or other multi-wheel drive vehicle.

A variety of all terrain vehicles have been developed for recreational, commercial, farm and military use. Such vehicles can include wheels and/or endless track assemblies to achieve traction over off-road surfaces with relatively low surface pressure at the contact surfaces of the drive train.

Snowmobiles represent an example of a track-based recreational vehicle that is used on snow and ice. The tracks, however, are not readily susceptible to operation over other types of terrain (e.g. abrasive, non-frozen) and use of the vehicle is limited to certain climates and seasons of the year.

A variety of other personal ATV's that support tracks, floatation tires and/or combinations of tires and tracks are also available for year round use over woodland, wet and swampy or desert terrain. The drive trains of the track-based ATV vehicles, like snowmobiles, are typically designed for dedicated use and cannot be readily adapted to alternative uses. Wheel-based ATV vehicles supported on floatation tires work well in woodland conditions, but have difficulty traversing snow, swamp and desert terrain.

An economical conversion assembly is therefore desired to expand the operational use of wheel-based ATV's and pickup trucks. Examples of some track assemblies that can be used to convert 4-wheel drive vehicles to track vehicles are shown at U.S. Pat. Nos. 3,689,123; 4,448,273; and 5,607,210.

The present improved track assembly was developed to accommodate the foregoing need and provides a number of improved features that accommodate a wide range of vehicles offered by a number of automotive and ATV manufacturers. Collectively, the improvements permit the conversion of the ATV's over to track operation in a matter of minutes.

The improved track assembly provides 1) a resiliently biased idler wheel suspension that conforms the shape of the track contact surface to terrain changes, 2) rubber coated, plastic idler wheels, 3) a drive wheel with a radiused peripheral edge to prevent ice and mud buildup, 4) an eccentric track tensioner housing that rotates the track drive wheel to control track tension, 5) a multi-vehicle adapter mounting plate, 6) stop limit flanges at a torsion mounting coupler, 7) a set screw restrained coupler arm, and 8) track lugs shaped to direct debris away from the track suspension and drive assembly.

SUMMARY OF THE INVENTION

It is a primary object of the invention to provide an endless track assembly that can be substituted for a wheel of a wheeled vehicle.

It is further object of the invention to provide an improved endless track assembly having an idler wheel suspension that conforms the track contact surface to contour changes in the terrain.

It is a further object of the invention to provide a resiliently biased idler wheel suspension that accommodates changing terrain contours without changing the track tension and maintains a relatively small area of ground contact to facilitate steering.

It is a further object of the invention to independently and resiliently bias multiple groupings of idler wheels to vary the track contour to maintain track contact with elevated obstructions and depressions and wherein each grouping is independently biased relative to the other groupings.

It is a further object of the invention to provide a track suspension with a pair of idler wheels having an adjustable, complementary resilient bias (e.g. compression or extension) such that a constant relative bias can be set and maintained between the idler wheels as the wheels rise and/or fall and correspondingly the track profile changes with contour changes.

It is a further object of the invention to provide a track suspension having fore and aft idler wheel sets and wherein the idler wheels are independently biased under compression or extension relative to each other.

It is a further object of the invention to provide a track support frame with a replaceable drive wheel having teeth protruding to the lateral sides to accommodate tracks having different pitches between the drive lugs.

It is a further object of the invention to provide a drive sprocket having a contoured peripheral edge shaped to direct ice, mud and other debris away from the edge.

It is a further object of the invention to provide an eccentric coupling between the frame and track to adjust track tension.

It is a further object of the invention to provide an eccentric housing at the drive sprocket that rotates within a mating aperture at the support frame to adjust track tension.

It is a further object of the invention to provide molded plastic idler wheels coated at a circumferential surface with a material adhesively complementary to the drive track material (e.g. rubber) to enhance gripping between the idler wheels and drive track and with exposed plastic sidewalls that contact and slip within track channels or grooves to minimize track wear.

It is a further object of the invention to provide a drive track wherein the belting and cords at the peripheral edges of the track are constructed to cup inward adjacent the sides of the drive sprocket and idler wheels to prevent detachment of the track from the support frame.

It is a further object of the invention to provide a multi-vehicle adapter plate that mounts to the drive sprocket and has shaped surfaces (e.g. contours, holes, slots, recesses, dimples etc.) that mate with different mounting configurations at a number of vehicles.

It is a further object of the invention to provide an anti-torque coupler between the track assembly and vehicle having first and second linkage pieces mounted to pivot relative to one another and wherein flanged surfaces at the linkage pieces limit rotation of the track assembly relative to the vehicle.

It is a further object of the invention to provide a coupler housing that mounts to a vehicle steering linkage (e.g. tie rod end or ball joint) and contains a setscrew that cooperates with a contoured surface of a mating linkage piece to draw the linkage piece into abutment with the housing and lock the connections to prevent vibration and loosening.

The foregoing objects, advantages and distinctions of the invention are obtained in the presently preferred track assembly of the invention. The assembly provides a cast metal support frame having right and left vertical risers and upper and lower cross beams. An aperture at the upper cross beam supports an eccentric housing mounted to a replaceable drive sprocket. The eccentric housing extends through a drive frame aperture and upon rotation induces the drive sprocket to establish the track tension. Flange arms of the frame at the aperture compressively capture the housing and alignment of the drive sprocket to the support frame to maintain an established track tension.

Lateral arms project from the drive sprocket and engage drive lugs at the interior of the track. The peripheral edge of the drive sprocket is contoured to prevent the build-up of ice, mud and debris at the drive sprocket and track grooves. Drive sprockets with different tooth spacings can be attached to the frame.

A multi-vehicle adapter plate couples the drive sprocket to a vehicle's lug bolts. Associated suspension linkages couple the track assembly to the chassis and/or steering surfaces of a variety of different vehicles.

Sets of independently biased, molded plastic, rubber coated idler wheels cooperate with the drive sprocket to support a lugged drive track. Two sets of differing sized idler wheels bias the forward and trailing ends of the drive track to induce changes in the track contact surface that mimic contour changes in the terrain.

Pivot pins secured to the lower cross beam support a pair of suspension or swing arms that support the axles of each set of idler wheel axles. Other pivot pins secure one end of a linkage or rocker arm that extends through a channel or bore in the lower crossbeam between the swing arms. A spring, mounted under compression with a threaded adjuster fitted to the frame, biases the opposite end of the rocker arm. Rotation of either swing arm induced by movement of the idler wheels over an elevated obstruction or into a depression is transferred via the rocker arm to the other idler wheel and is opposed or assisted as determined by a pre-set, adjustable bias at the spring.

A torsion control coupler is secured to one of the vertical risers and a pair of linkage pieces extend from a core piece. Flanges at the linkage pieces project to interact as stops to limit the maximum rotation of the track assembly. A steering piece mounts between one of the linkage pieces and a coupler housing that captures the steering linkage of the vehicle, for example a tie rod end. A contoured surface of the steering piece cooperates with a setscrew at the coupler housing to capture and lock the tie rod end against vibration.

Shaped lugs project from the track interior to define channels for the plastic idler wheels. Lateral uncoated sides of the idler wheels contact the channel walls and a rubber tread band contacts the track. The lugs scrape debris from the idler wheels and provide surfaces shaped to direct the debris away from the track interior Still other objects, advantages, distinctions and constructions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

Figure 1:
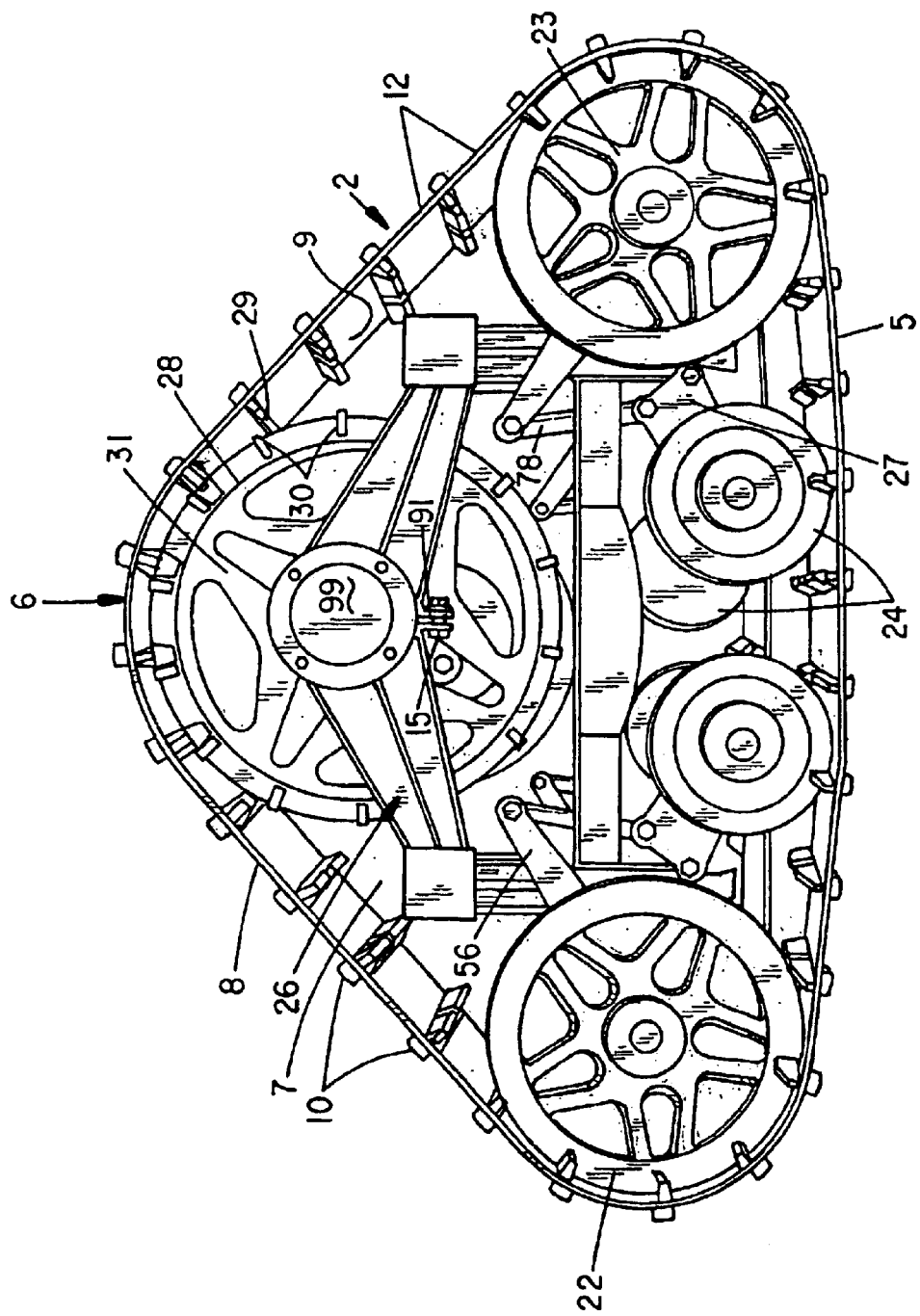
FIG. 1 is an assembled front perspective drawing of the track assembly.

Similar structure throughout the drawings is referred to with the same alphanumeric reference numerals and/or characters.

DESCRIPTION OF THE PREFERRED EMBODIMENT

Figure 2:
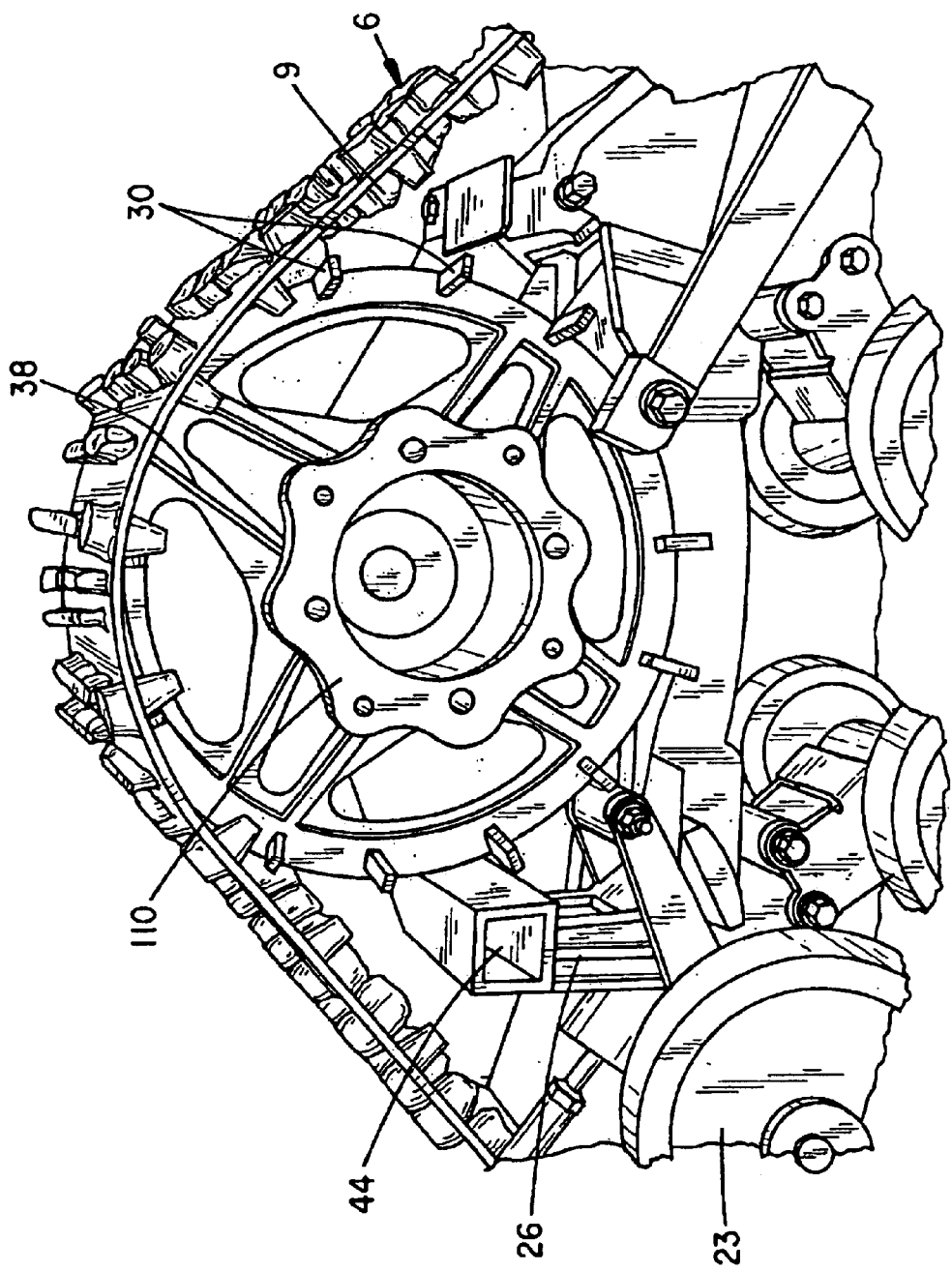
FIG. 2 is an assembled rear perspective drawing of the track assembly.
Figure 3:
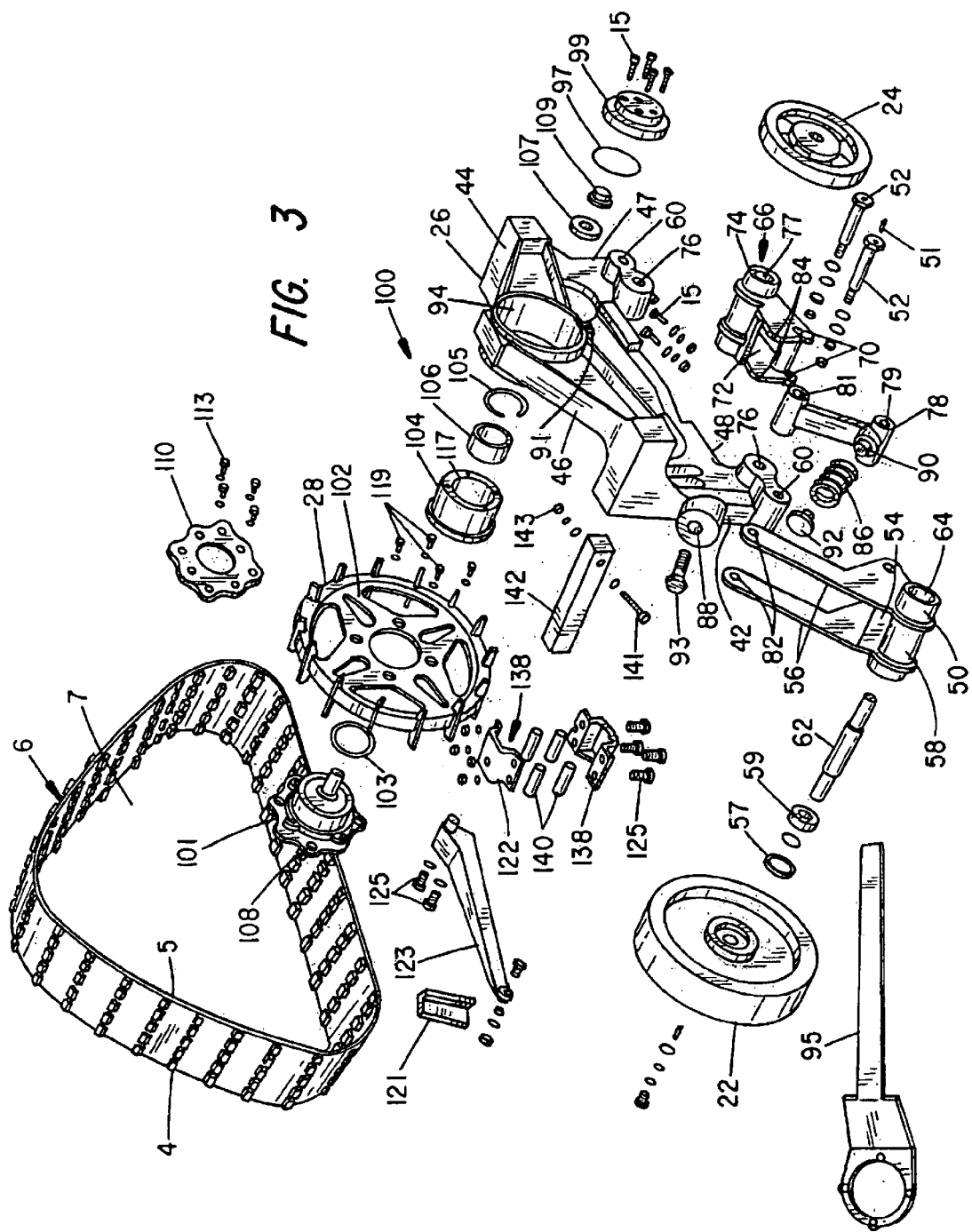
FIG. 3 is a perspective drawing of the track assembly shown in exploded assembly.

Referring to FIGS. 1–3, front, rear and exploded assembly views are shown to the improved track assembly 2 of the invention. Individual track assemblies 2 are typically mounted to the drive and non-drive wheels of an ATV, truck or other vehicle to convert the vehicle over to off road travel over snow, sand and other terrain that requires a relatively low contact surface pressure. The assemblies 2 when adapted to a typical personal ATV provide a contact surface pressure of less than one-pound per square inch. Larger track assemblies 2 can be adapted to automotive vehicles, such as ½ to 1 ton pickup trucks or even larger vehicles.

Each track assembly 2 generally provides a reinforced, endless track 6. The track 6 is typically constructed of rubber with suitable belting and reinforcing fibers to withstand typically encountered terrain, including rocks, logs, mud, sand etc. Exposed lateral, peripheral edges 4 and 5 of the track 6 are constructed to cup slightly inward upon setting a preferred tension. The cupping of the track edges 4 and 5 in the space adjacent exposed sides of adjoining idler wheels facilitates retention of the track 6 to the suspension.

The track 6 provides an outer surface 8 and an inner or interior surface 9 and circumscribes an interior space 7. The outer ground contact surface 8 is provided with an array of lugs 10 of desired shapes and sizes that are typically arranged in displaced rows or other desired arrangements. The lugs 10 are generally shaped and located to enhance traction and travel over an anticipated terrain. The inner surface 9 of the track 6 includes a series of rows 12 of laterally displaced inner lugs 14 and outer 16, reference FIG. 4. The lateral separations between the lugs 14 and 16 define a pair of longitudinal, outer idler wheel channels 18 that are displaced from a center longitudinal, inner drive wheel channel 20.

The track 6 is suspended around two forward and two aft idler wheels 22 and 23 and four inner idler wheels 24. The idler wheels 22–24 (eight idler wheels total) are mounted to the lateral sides of a track frame 26 and rotate in the channels 18. The fore and aft idler wheels 22 and 23 exhibit a larger diameter (e.g. 8 to 12-inches) than the inner idler wheels 24 (e.g. 3 to 6-inches).

Figure 10:
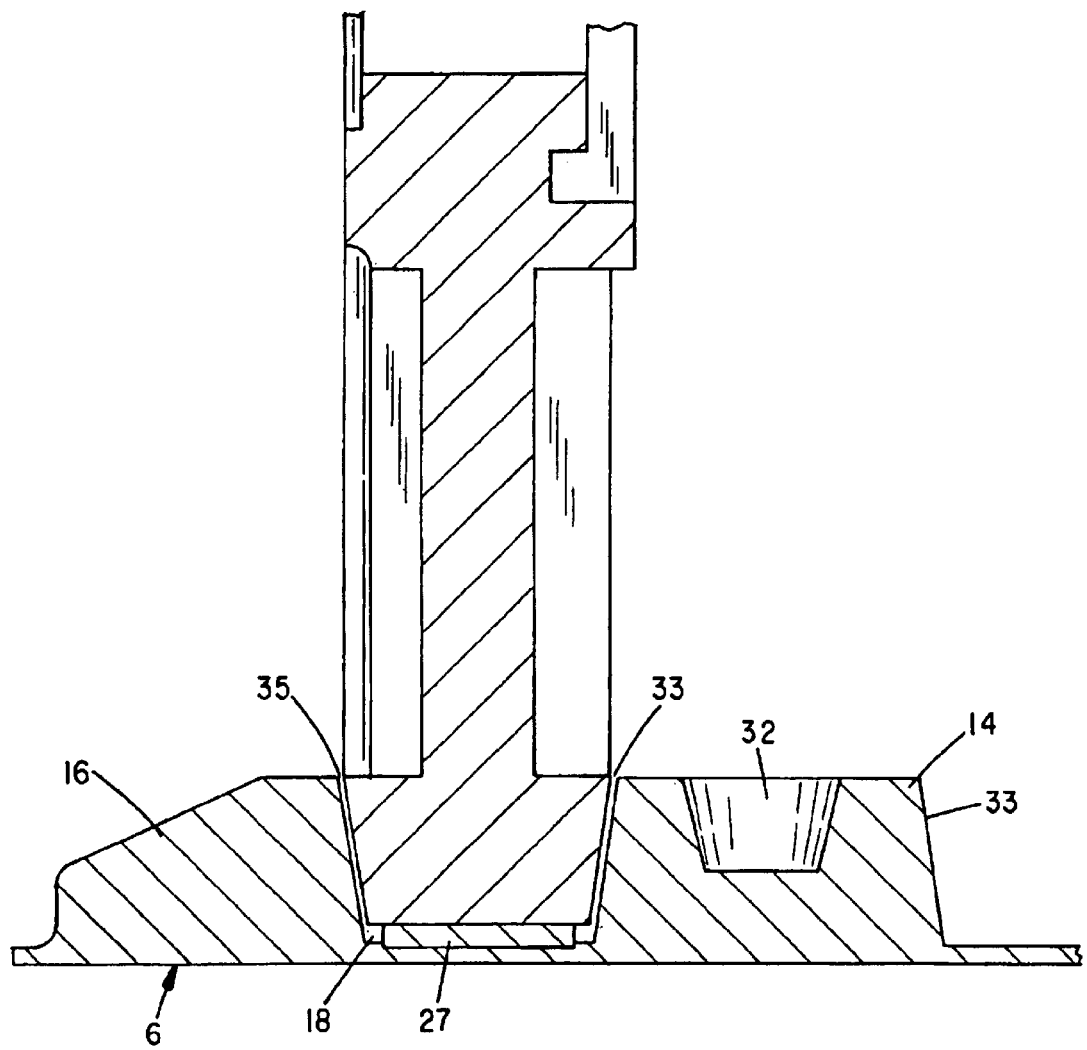
FIG. 10 is a cross section view showing the peripheral edge shape of an idler wheel relative to a drive channel at the track interior.

A rubber tread band or annulus 27 is fitted to the circumferential support surface of each of the idler wheels 22–24 to cushion and provide traction with the inner track surface 9, reference FIG. 10. The band 27 can be constructed from a variety of materials and/or may have a contact surface with the tread surface 9 that is, for example, shaped with grooves or projections to facilitate contact, traction and rotation relative to the track 6. The band 27 can be insert molded with the wheels 22–24 or be separately mounted and/or bonded or coated to the wheels 22–24.

The idler wheels 22–24 are constructed from compression-molded plastic, although can be constructed of other materials and/or can be constructed with other fabrication processes. The idler wheels 22–24 run in the channels 18 and the relatively slippery plastic sides of the wheels 22–24 lie adjacent the vertical sidewalls of the longitudinal grooves 18. The plastic slips upon contact with the lugs 10. The wheels 22–24 are relatively intolerant to the adhesion of debris, which is readily discharged from the wheels 22–24 and track interior as discussed below.

A cast aluminum drive wheel or sprocket 28 rides in the channel 20. Lateral flange arms 30 project from the sidewalls of a multi-spoked hub 31 and engage the leading surfaces 34 of the lugs 14 and 16 and the drive track 6. The circumferential edge 29 of the drive wheel 28 is shaped to prevent the buildup of ice and/or debris at the drive wheel 28, reference FIG. 9. The edge 29 is particularly contoured to exhibit a compound-arcuate profile configured from several back-to-back quarter-round surfaces. Several reliefs or recesses are formed which cooperate with the channel 20 to dislodge and eject debris.

Figure 4:
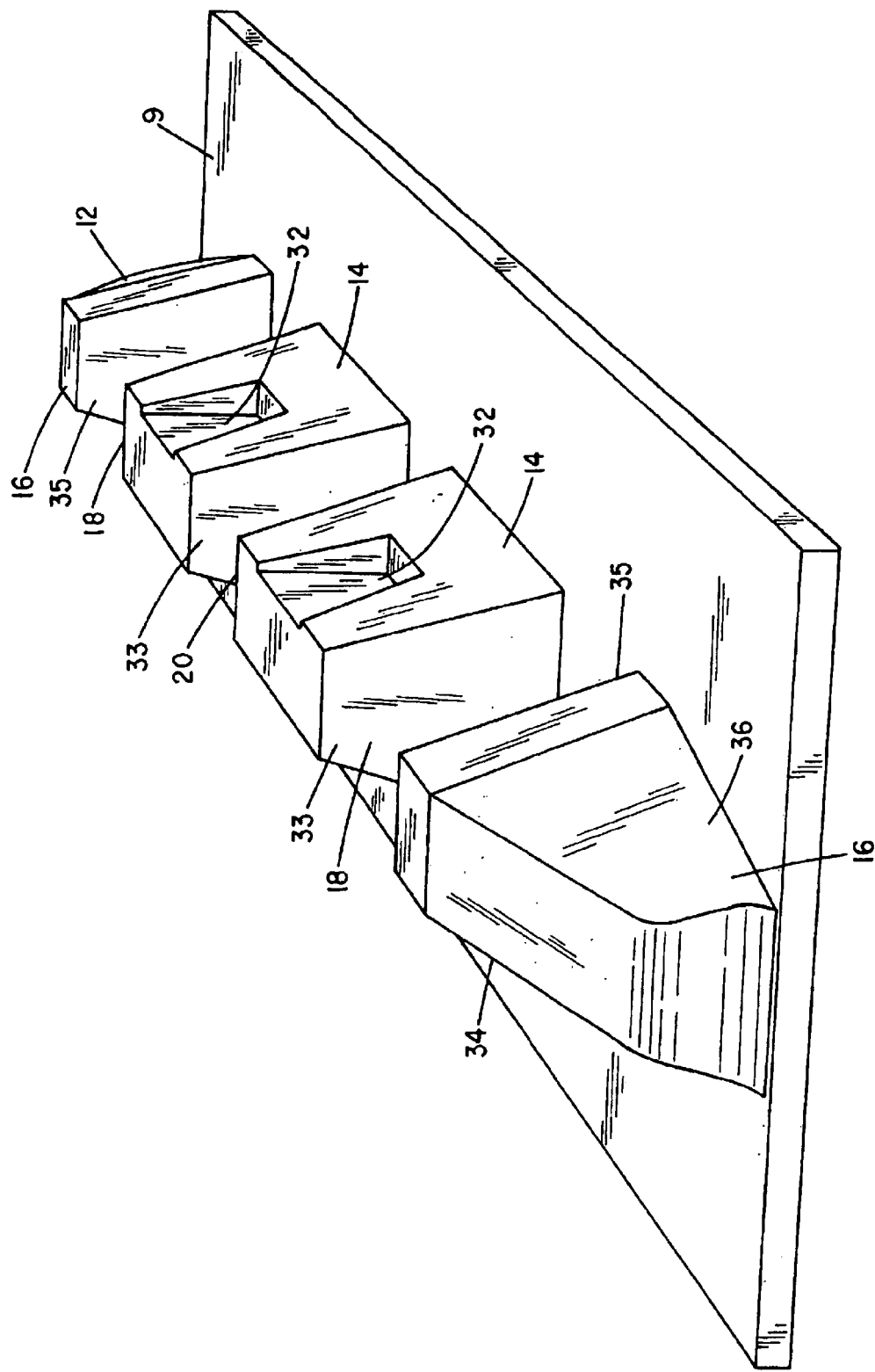
FIG. 4 is a perspective drawing of a row of drive lugs at the interior surface of the track.
Figure 9:
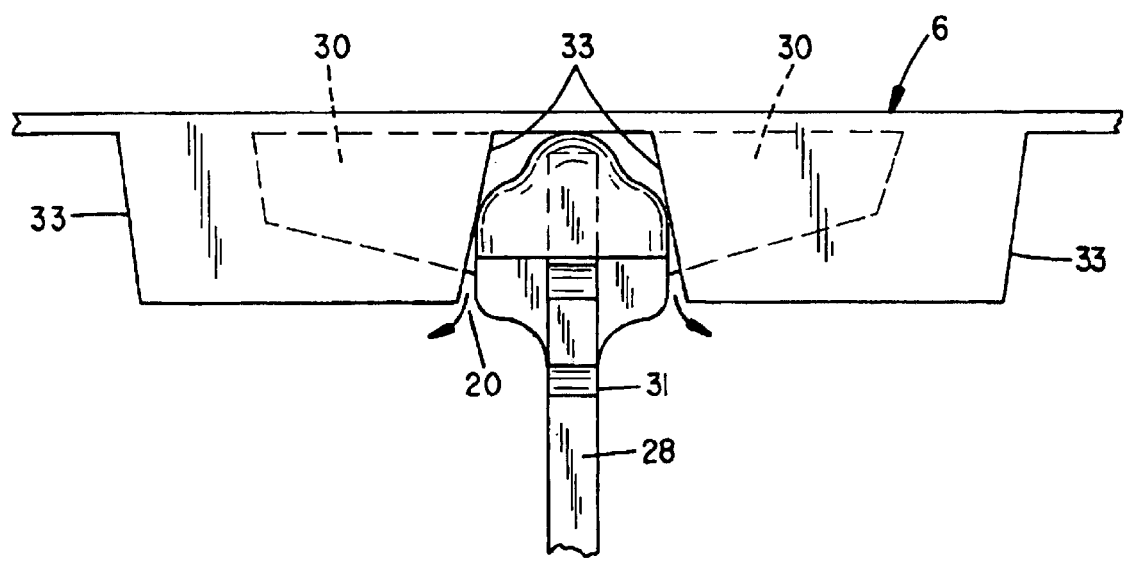
FIG. 9 is a plan view showing the peripheral edge shape of the drive wheel relative to a drive channel at the track interior.

With attention to FIGS. 4, 9 and 10, the collection of debris is further reduced via a cooperative wiping action that occurs as the flange arms 30 contact each row 12 of lugs 14 and 16. The leading surface of the adjoining lugs 14 is generally flat and projects orthogonal to the inner track surface 9 to promote contact with the flange arms 30. The sidewalls of lugs 14 and 16 at the outer and inner channels 18 and 20, in turn, exhibit tapered surfaces 33 and 35 that flare inward as they rise from the surface 9. The tapered surfaces 33 of the channel 20 scrape and relieve debris that is released from the peripheral edge 29 of the drive wheel 28. Recesses 32 at the trailing surfaces of the lugs 14 further relieve debris from the drive wheel 28 and/or interior of the track 6.

The tapered surfaces 33 and 35 at the channels 18, otherwise, conform to complementary tapered plastic sidewalls at the idler wheels 22–24. Any debris at the idler wheels 22–24 is scraped from the sides of the wheels 22–24 as the wheels 22–24 rotate along the channels 18. The plastic to rubber contact also provides for less abrasion than experienced with conventional tracks. The leading and lagging vertical walls 34 and 36 of the lugs 16 each exhibit compound tapers that project to a flat apex. The walls 34 and 36 also taper as they extend laterally toward the lateral edge of the track 6 such that debris scraped from the idler wheels 22–24 is directed away from the interior of the track 6. The idler wheels 22–24 are thus able to run smooth without collecting debris and possibly dislodging the track 6 from the frame 26.

Returning attention to FIG. 3 and although only to of the eight idler wheels 22–24 are shown, each track assembly 4 is constructed to resiliently bias the idler wheels 22–24 to follow and conform the track 6 to contour changes in the terrain. In a resting condition (shown in dashed line), the track frame suspension supports the track 6 to the frame 26 to exhibit a generally isosceles triangular-shaped longitudinal profile or contour, reference FIGS. 5 and 6. During motion, the idler wheels 22–24 independently and resiliently allow the forward, middle and aft end portions of the track's ground contact surface 8 to flex and undulate.

Figure 5:
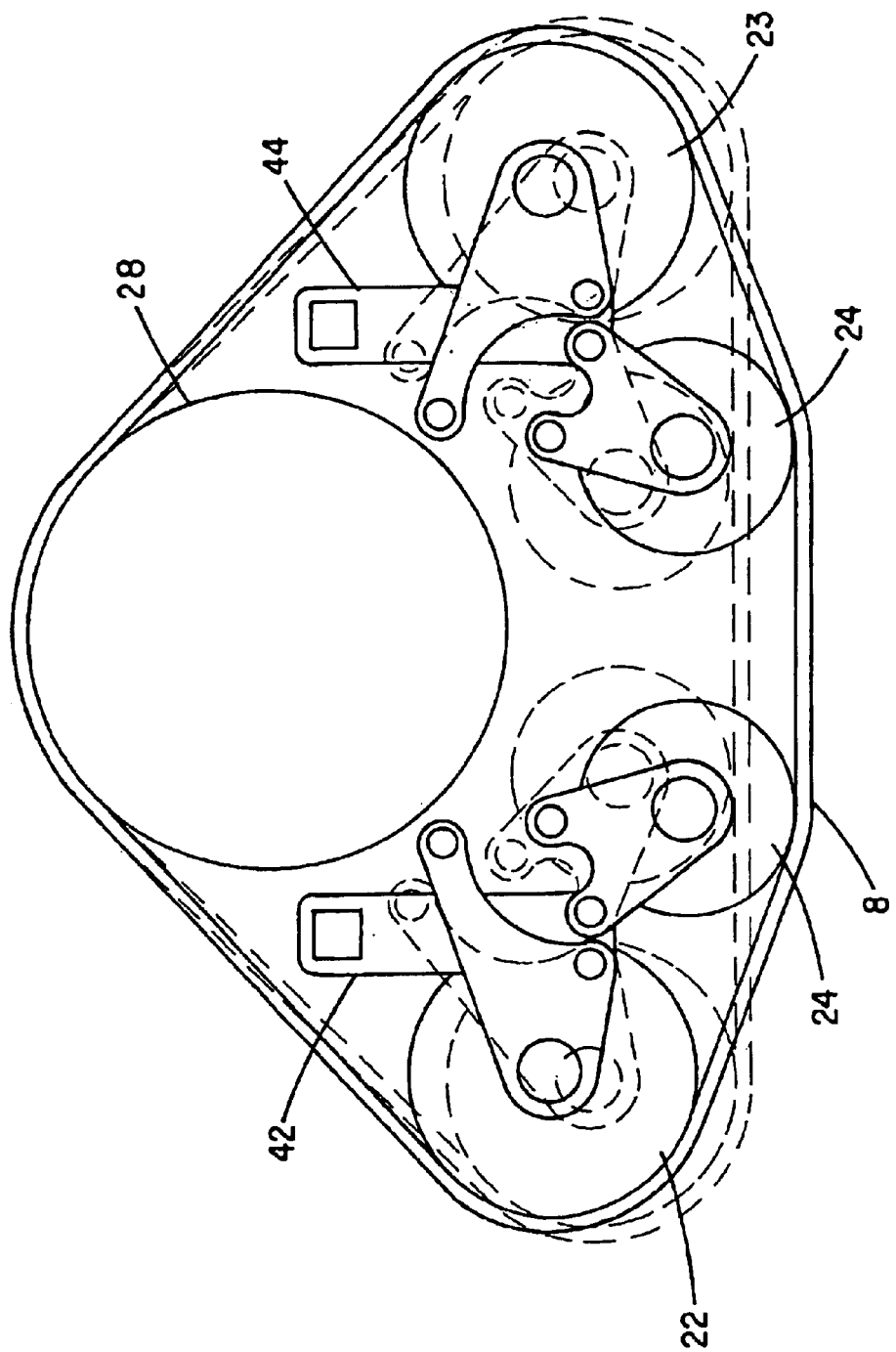
FIG. 5 is a diagrammatic representation showing alternative idler wheel positions and related contour changes at the drive track to accommodate elevated obstructions.
Figure 6:
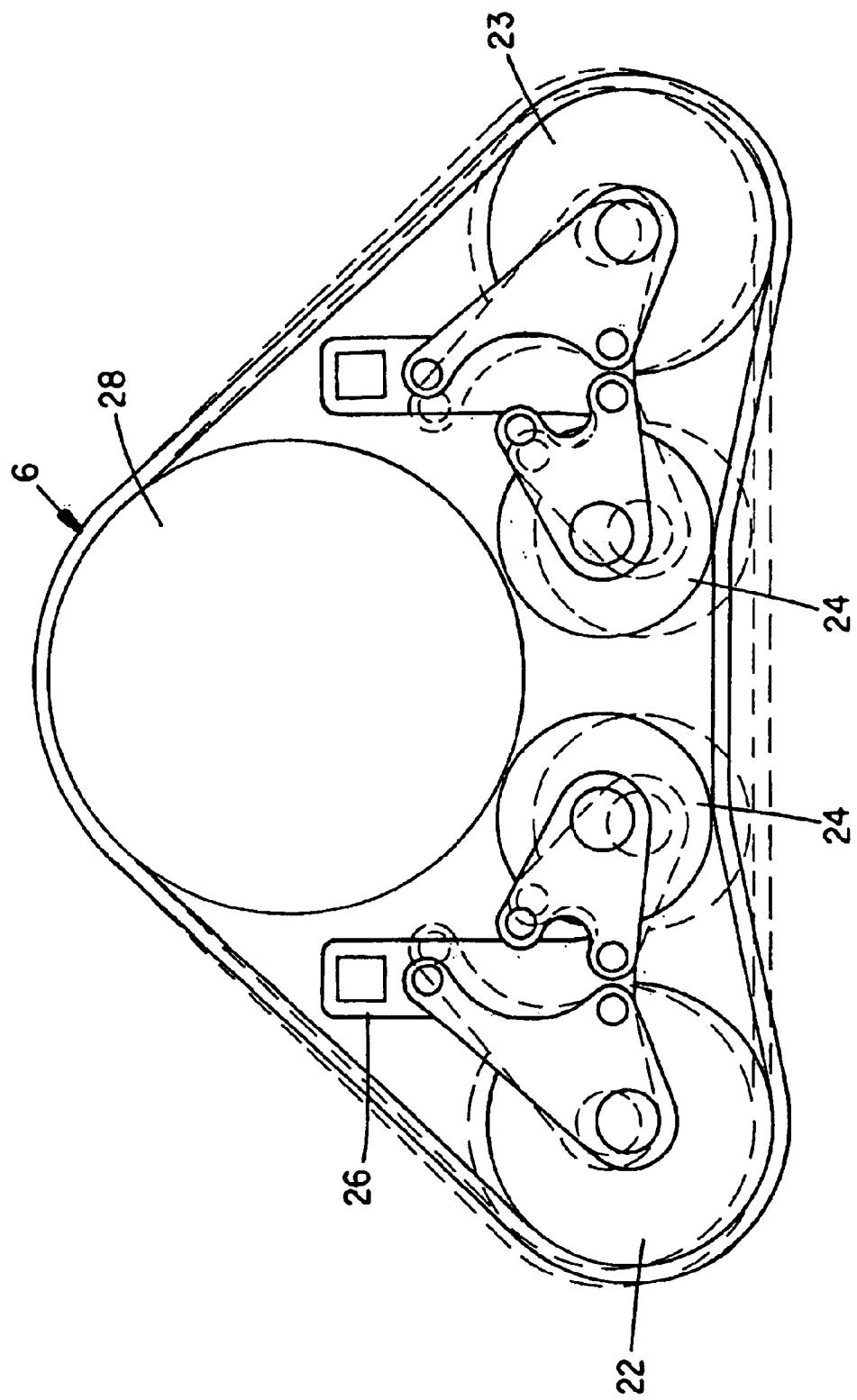
FIG. 6 is a diagrammatic representation showing alternative idler wheel positions and related contour changes at the drive track to accommodate depressions in the terrain.

The longitudinal profile or contour of the track 6 is directed by the idler wheels to maintain steering control and optimal contact with the terrain such as shown in solid line at FIGS. 5 and 6. This is achieved by independently biasing the forward and aft sets of the idler wheels 22,24 and 23,24 relative to each other. The preset bias of each set of idler wheels 22,24 and 23,24 is separately adjusted to allow the user to tailor the ride of each track assembly 4.

Movement of the contact surface 8 over an elevated obstruction or into a depression induces the forward idler wheels 22 and the adjacent idler wheels 24 to rotate and change the track contour. For example and with attention to FIG. 5, if the forward idler wheels 22 rise and rotate clockwise relative to the frame 26, the adjacent idler wheels 24 are directed to follow clockwise by a rocker arm linkage 78. A resilient biasing member 86 expands and biases the rocker arm 78 to assist the rotation and maintain track contact with the ground.

Alternatively and with attention to FIG. 6, if the forward idler wheels 22 follow a depression and rotate counterclockwise relative to the frame 26, the following idler wheels 24 are directed to follow by the rocker arm 78. The biasing member 86 is simultaneously compressed to resist the rotation. In either instance, the area of the contact surface 8 with the terrain is resiliently optimized, which promotes traction and steering control. The adjacent aft set of idler wheels 23 and 24 are similarly biased to ensure track contact.

The forward set of two idler wheels 22 and two adjacent inner idler wheels 24 are mounted to pivot about the frame 26 and are resiliently biased with an adjustable, resilience preset by a spring member 86 on the rocker arm 78. The two aft idler wheels 23 and two adjacent inner idler wheels 24 are mounted to independently pivot about the frame 26 and are biased with a separately adjusted, bias member 86 abutting the rocker arm 78. As the contact surface 8 negotiates the terrain, the leading and lagging sets of idler wheels 22, 24 and 23,24 cooperate to induce the track 6 to conform to the terrain.

The manner of mounting the idler wheels 22–24 and drive wheel 28 to the drive frame 26 is apparent from FIG. 3. The frame 26 provides forward and aft vertical riser members 42 and 44. Upper and lower cross members 46 and 48 connect the riser members 42 and 44. The idler wheels 22–24 are secured to the lower cross member 48 and the drive wheel 28 is secured to the upper cross member 46. The mechanical construction and suspension of each of the forward and aft sets of idler wheels 22, 24 and 24, 23 is identical and is described below for only one side of the forward set of wheels 22, 24, but should be understood to be the same for the aft set.

The forward idler wheels 22 are secured to the bottom of the riser member 42 with an outer suspension arm 50 and a pivot pin 52. Zerk fittings 51 are mounted to the pin 52 to facilitate lubrication of the pivot. The pivot pin 52 extends through apertures 54 in a pair of outer swing arms 56 that extend from a bushing piece 58 and a bore 60 at the riser member 42. The swing arms 56 mount to the lateral sides of the riser member 42. An axle 62 extends through a bore 64 of the bushing piece 58, seals 57 and bearings 59 and supports the forward idler wheels 22.

The inner idler wheels 24 are secured to the bottom of the riser member 42 with a suspension arm 66 and another pivot pin 52 outfitted with a zerk fitting. The pivot pin 52 extends through apertures 70 in a pair of swing arms 72 that extend from a bushing piece 74 of the suspension arm 66 and align with a bore 76 at he riser member 42. The swing arms 72 mount to the lateral sides of the riser member 42. An axle 62 extends through a bore 77 of the bushing piece 74, seals 57 and bearings 59 and supports the inner idler wheels 24.

A link arm or rocker arm 78 mounts through a vertical aperture 47 in the cross member 48 and is secured between and to the swing arms 56 and 70 with pivot pins 52 that don't contain zerk fittings. The pivot pins 52 particularly mount between apertures 82 and 84 at the swing arms 56 and 72 and bores 79 and 81 at the rocker arm 78. Forces exerted on either of the pairs of idler wheels 22 or 24 relative to the frame 26 is transferred by the rocker arm 78 to the adjoining set of idler wheels.

A spring 86 is mounted in a bore 88 of the riser member 42 and is contained between an end cap 92 that is secured to the bore 88 and a eat 90 at the link arm 78. A pre-loaded condition of either tension or compression of the spring 86 is established with a bolt 93 that extends through the riser 42 and contact the cap piece 92. Any movement of the idler wheels 22, 23 or 24 is thus opposed or assisted in relation to the compression or expansion of the spring 86 in relation to the pre-loaded condition. As the longitudinal profile or contour of the track 6 changes to conform to the terrain, the track tension however does not change with movement of the idler wheel suspension.

Figure 7:
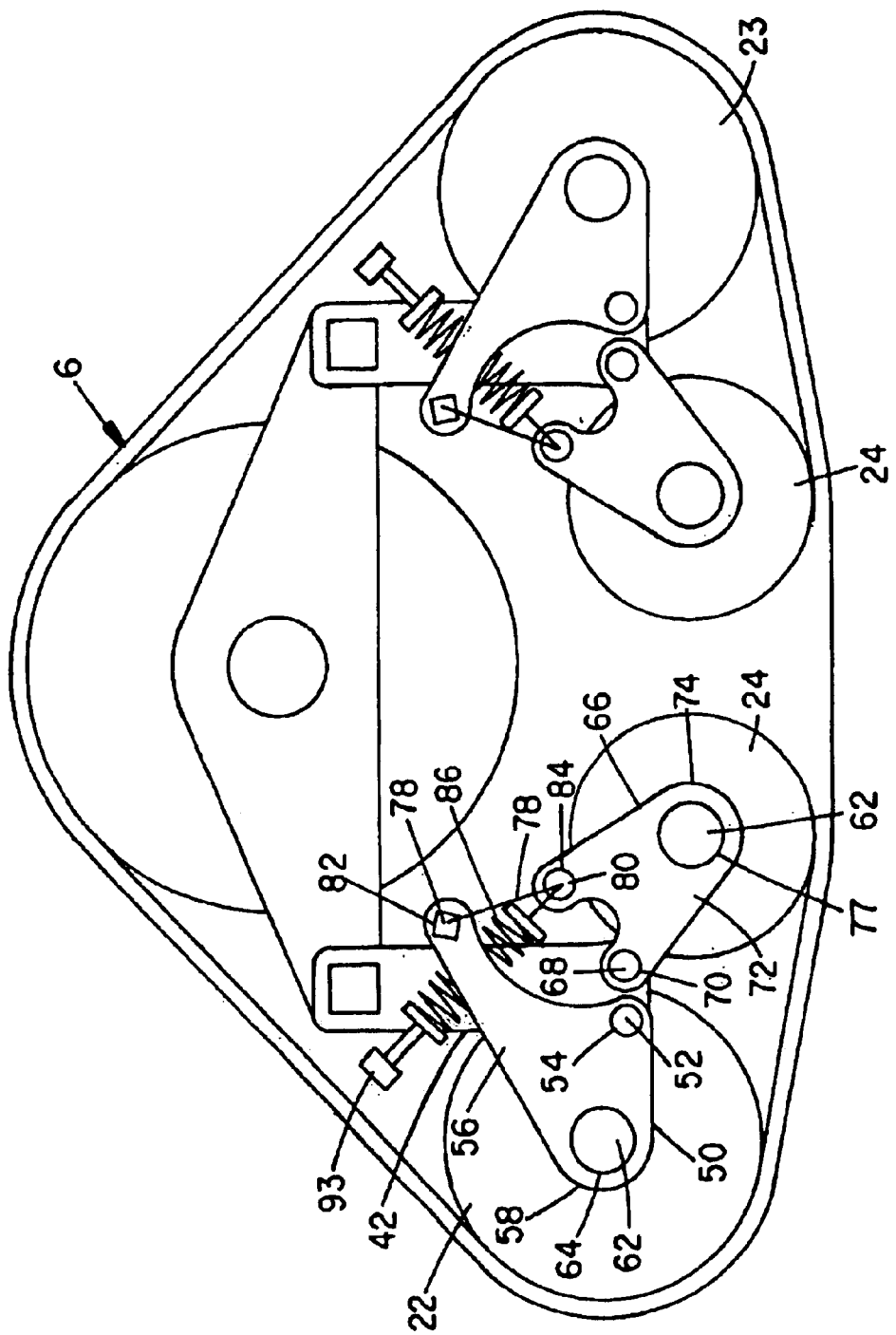
FIG. 7 is a diagrammatic representation of a compressively biased idler wheel suspension.
Figure 8:
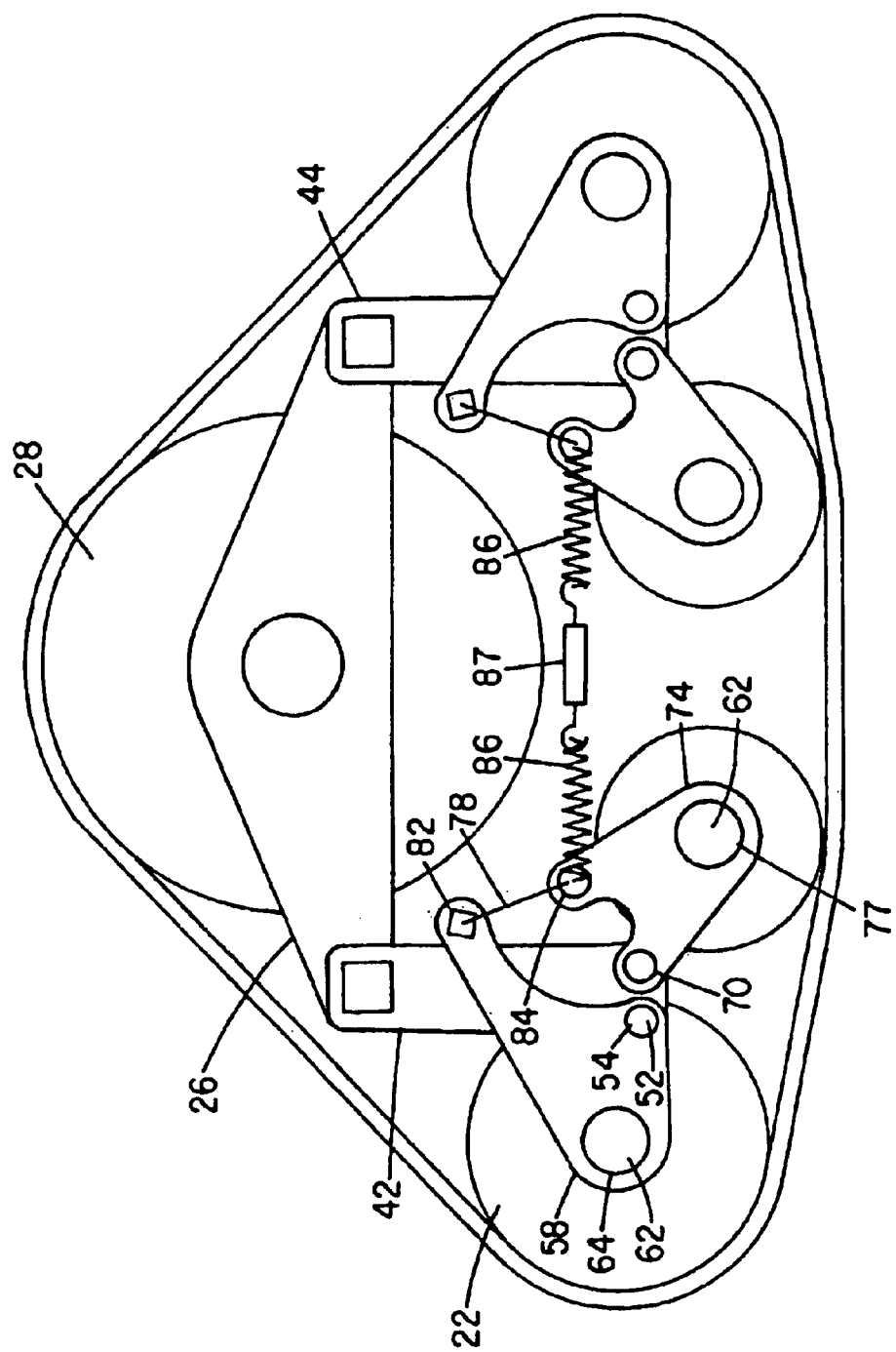
FIG. 8 is a diagrammatic representation of an idler wheel suspension biased with springs mounted in extension.

FIGS. 7 and 8 separately depict in diagrammatic form two generalized alternative ways to bias the grouped sets of idler wheels 22,24 and 23,24. FIG. 7 demonstrates the compressive mounting of the spring 86 shown and used in the preferred embodiment of the assembly 2 and discussed with respect to FIGS. 3, 5 and 6. FIG. 8 demonstrates a mounting of the spring 86 in extension relative to an intermediate turnbuckle or anchor piece 87. Opposite hooked ends of the turnbuckle 87 are independently adjusted to vary the static extension and resilient bias on the springs 86 and the forward and aft sets of idler wheels 22,24 and 23,24.

Figure 11:
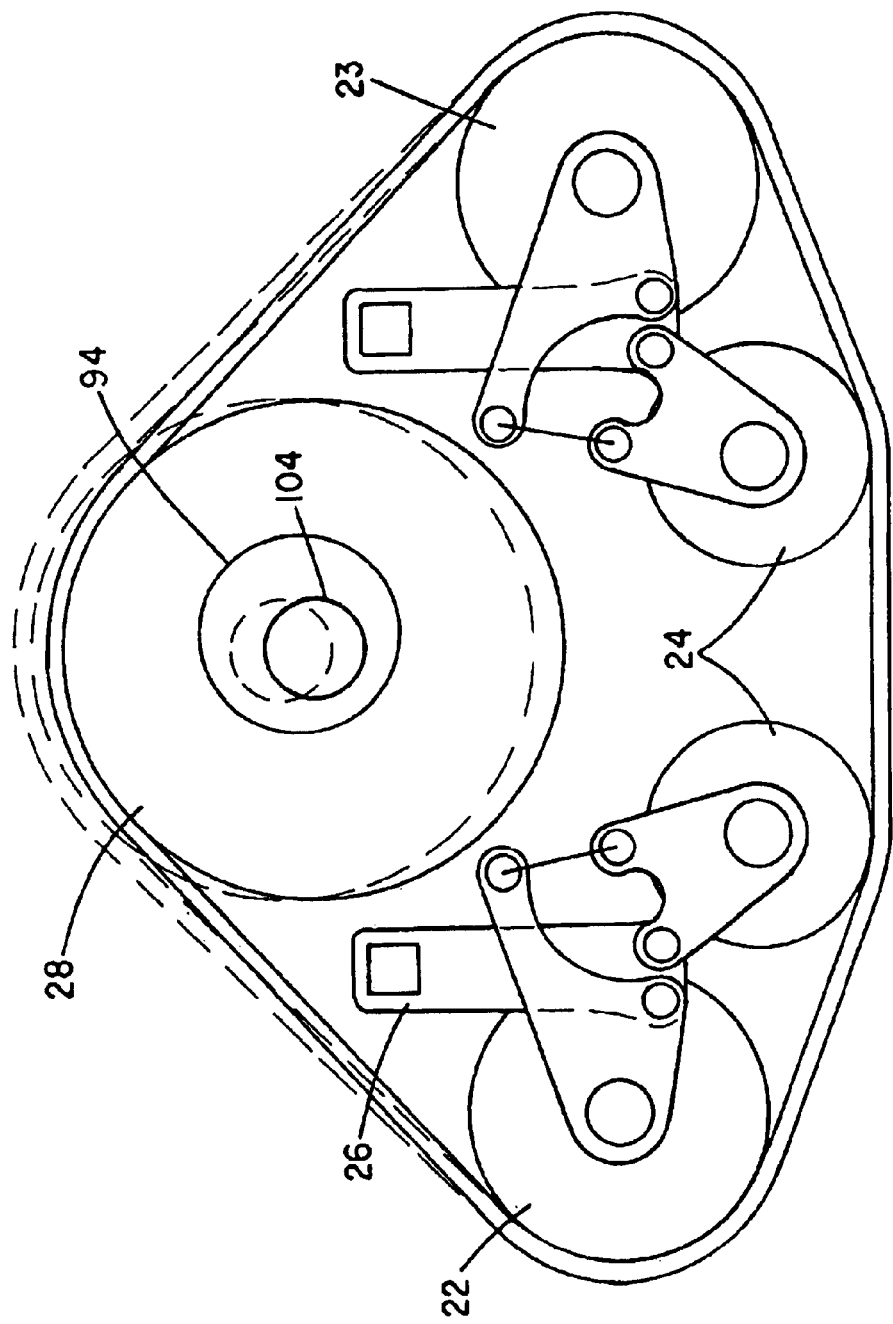
FIG. 11 is a diagrammatic representation showing alternative track tensions at the drive track at different rotations of the eccentric drive track tensioner.

With continuing attention to FIG. 3 and additional attention to the diagrammatic FIG. 11, the tension of the track 6 relative to the idler wheels 22–23 and drive wheel 28 is separately established with an eccentric mounting of the drive wheel 28 to a bore 94 at the upper cross member 46. The track tension is particularly established with an eccentric assembly 100 that rotates within the bore 94.

The assembly 100 includes a hub 101 that mounts through a seal 103 and bolts to the drive sprocket 28 with fasteners 119. An eccentric shaped bearing housing 104 having a bore 117, that is drilled off-center to provide an eccentric surface, extends from the hub 101 and rests in the bore 94. A separate, cylindrical spindle bearing 106 is secured in the bore 117 of the housing 104 with a snap ring 105. The housing 104 and spindle bearing 106 are retained to the hub 101 with a washer 107 and nut 109. A cover or lock cap 99 and seal 97 are secured to the end of the housing 104 with a number of fasteners 15.

Upon loosening carriage fasteners 15 at flanges 91 that depend from the frame 26 at the bore 94 and beneath the cap 99 and rotating the cap 99 with a wrench 95, the housing 104 rotates around the spindle bearing 106 within the bore 94 and the drive sprocket 28 is moved. Depending upon the relative rotation of the eccentric housing 104, which rotates in eccentric relation to the spindle bearing 106, the drive sprocket 28 stretches or relaxes the tension of the track 6. Once a preferred track tension is established, the fasteners 15 are tightened to draw the frame 26 at the bore 94 into compression with the bearing housing 104 to fix the tension on the track 6. It is to be appreciated a variety of other fastening arrangements may be used to secure the established position of the bearing housing 104.

Figure 12:
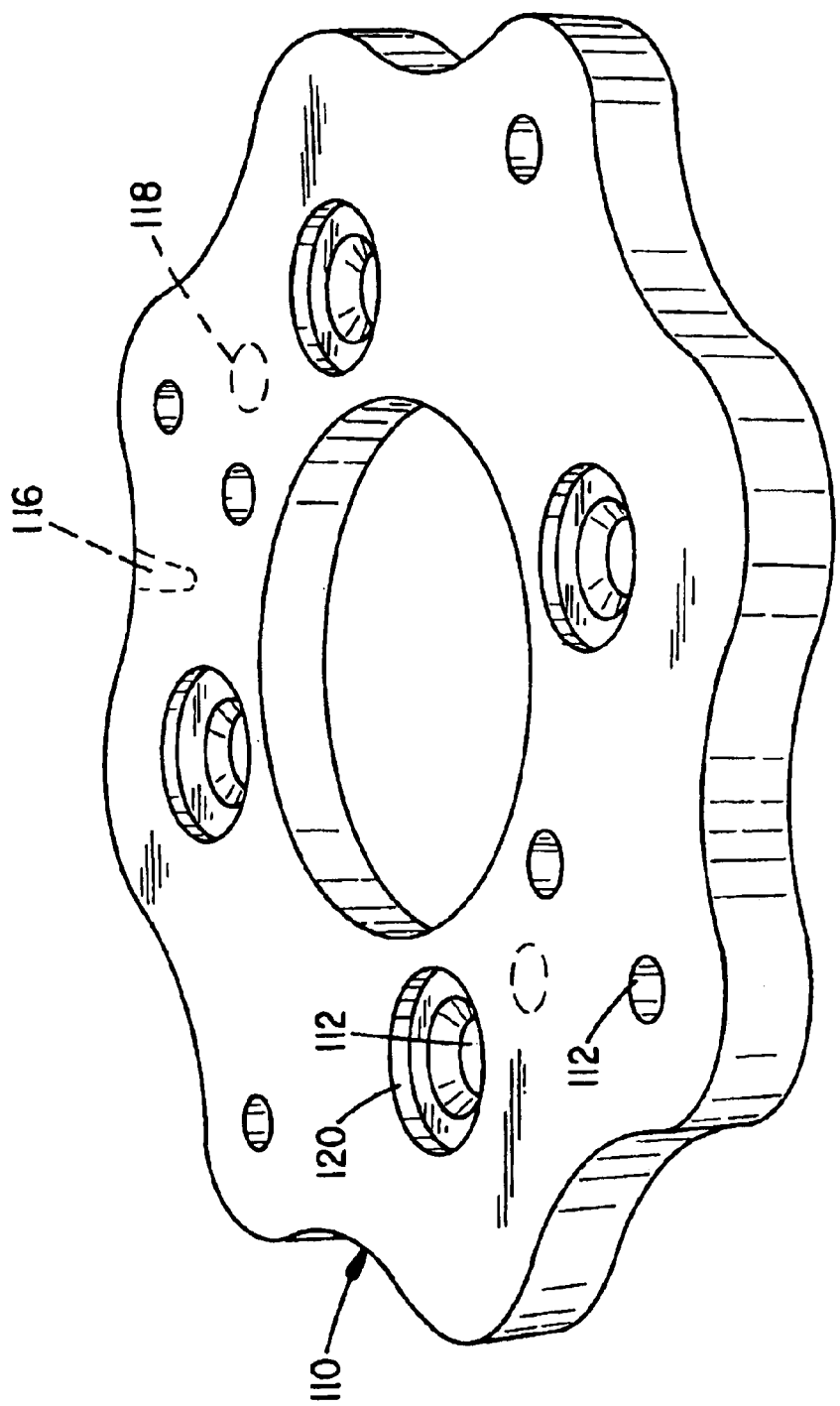
FIG. 12 is a plan view showing the mounting plate adapter.

The track assembly 2 is typically secured to the vehicle at available lug bolts that extend from the vehicle wheel and mount to holes 108 at the hub 101. Due to the wide range of vehicles with which the assembly 2 is compatible, a special adapter plate 110 is provided to facilitate mounting the track assembly 2 to each of the vehicles. A presently preferred plate 110 is shown at FIG. 12 and mounts between the hub 101 and the vehicle drive train, typically the driven or un-driven hubs of a converted vehicle. The adapter plate 110 is held to the hub 101 with a number of fasteners 113. Any number of apertures 112, slots 116 and/or raised surfaces 118 or depressions 120 can be provided at the adapter plate 110 to align with a particular mounting geometry of a vehicle. The adapter plate 110 has particularly been designed to mount to several different lug bolt arrangements of identified ATV's and allow clearance over protruding brake inspection covers and other adjoining vehicle parts.

Figure 13:
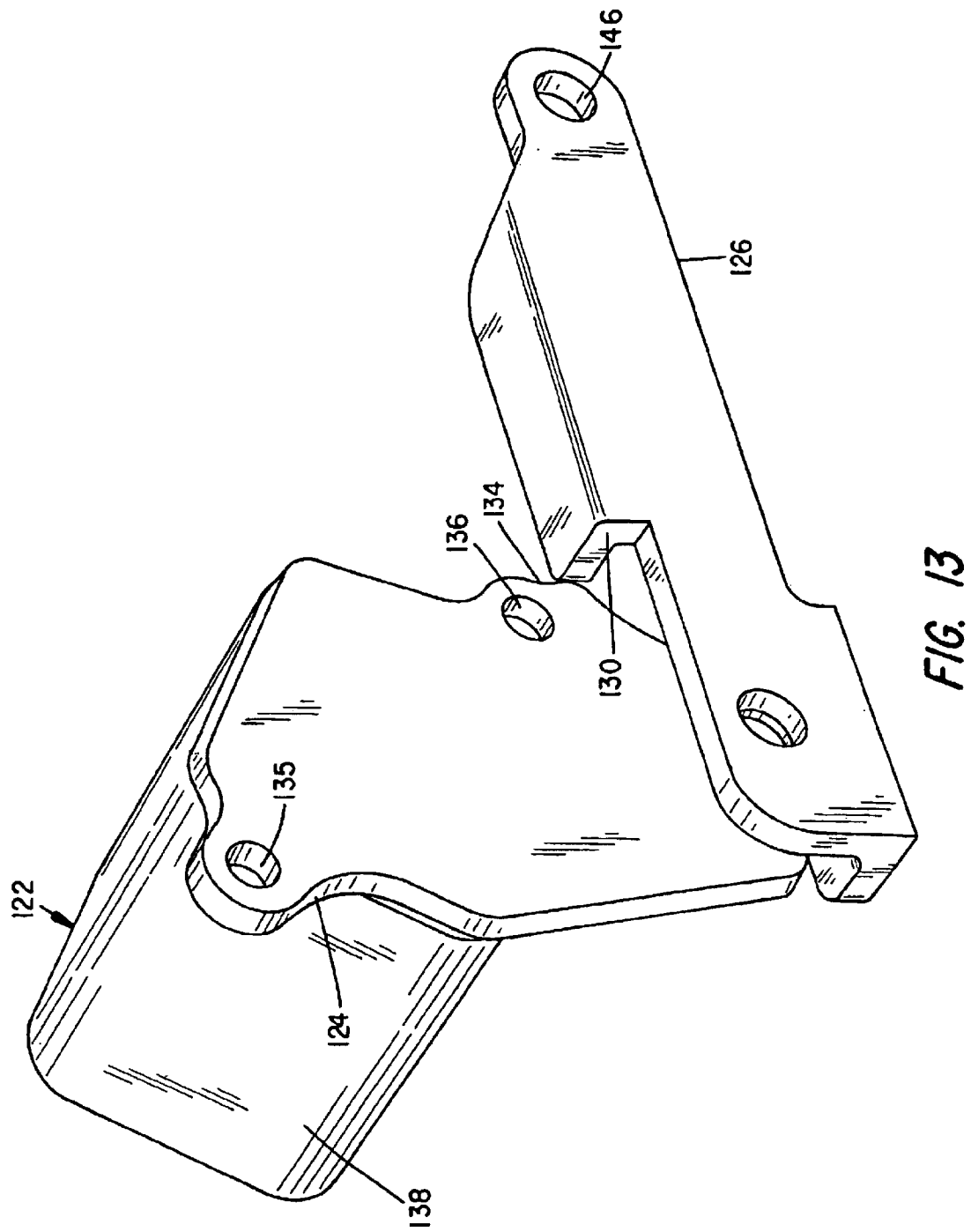
FIG. 13 is a perspective drawing showing a two-section coupler to the torsion control housing.

Returning attention to FIG. 3 and with additional attention to FIG. 13, the track assembly 2 is separately secured to the vehicle with a torsion control assembly 122 to limit the relative rotation of the track assembly 2 to the vehicle. A pair of coupler arms 121 and 123 or improved coupler arms 124 and 126 are secured to the assembly 122. The arms 123 and 124 are secured to a pair of brackets 138 with fasteners 125. The coupler brackets 138 contain resilient or elastomer shims 140. The arms 121 and 126 are separately secured to a cooperating steering or stationary surface at the vehicle.

A torque tube 142 extends from an appropriate one of two apertures 144 in the risers 42 and 44 and is secured to the drive frame 26 with bolt and nut fasteners 141 and 143. The torque tube 142 might also be secured to the riser 42 and 44 with a variety of alternative fasteners. For example, the tube 142 might include spring pins or other projections that snap into mating apertures or recesses provided at the apertures 44.

Figure 14:
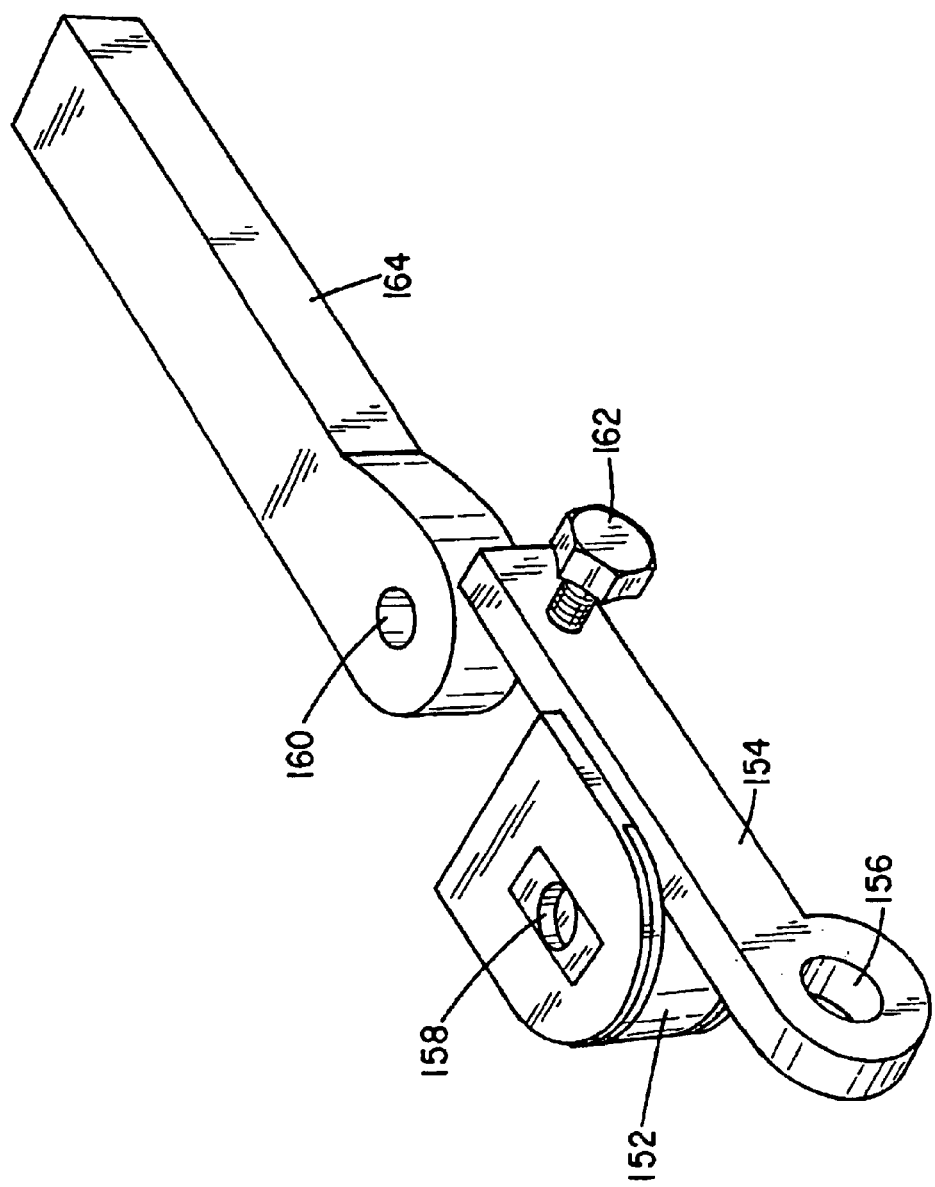
FIG. 14 is a perspective drawing showing a steering arm coupler housing and control arm.

An outer section of the torque tube 142 nests in the shims 140. A flared outer end of the torque tube 142 retains the torque tube 142 at an equilibrium condition in the brackets 138. Clockwise and counterclockwise Rotation of the torque tube 142 is resisted by the shims 140 and thereby prevents contact between the track assembly 2 and the vehicle.

Where the coupler arms 124 and 126 of FIG. 13 are used to couple the track assembly 2 to a vehicle, stop flanges 128 and 130 are provided to limit the maximum rotation of the track assembly 2. That is, the stop flanges 128 and 130 limit rotation of the arm 126 relative to the surfaces 132 and 134 at the arm 124. As the arms 124 and 126 normally rotate, the flanges 128 and 130 contact the surfaces 132 and 134 to prevent over-rotation of the assembly 2 relative to the assembly 122 and contact with the vehicle.

Where the arm 126 couples to a steering surface of the vehicle, such as a tie rod end, an improved locking coupler 150 shown at FIG. 14 is mounted to the arm 126. The coupler 150 prevents possible loosening of the critical steering connection. The coupler 150 provides a housing 152 having a locking bar 154 that is welded to the housing 152. The housing 152 captures the vehicle's tie rod end to the end of a steering arm 155 that separately connects to a vehicle steering surface. The configuration of the housing 152 and arm 154 can be varied to accommodate different types of tie rods.

The housing 152 is typically secured to the vehicle with a fastener between an aperture 156 at the locking arm 154 and the aperture 146 of the coupler arm 126. A vehicle tie rod end (not shown) mounts through an aperture 158 in the housing 152, which can be hexagonal shaped and/or include flat surfaces that align with flat surfaces at the tie rod end, and an aperture 160 in the vehicle steering arm 155.

The connection is locked or prevented from loosening upon separately securing a setscrew 162 at the locking bar 154 to contact a surface 164 of the arm 155 and draw the arm 154 and the tie rod end to the housing 152. A nut (not shown) separately secures the tie rod to the housing 152. An additional brace (not shown) may also be fitted between the housing 152 and adjoining suspension components of the vehicle to help support the steering arm 155.

While the invention has been described with respect to a number of preferred constructions and considered improvements or alternatives thereto, still other constructions may be suggested to those skilled in the art. It is also to be appreciated that selected ones of the foregoing features, for example, the independently biased idler wheel suspension, contoured drive sprocket, eccentric tensioner, rotation limited torsion coupler and/or steering coupler arms, can be used singularly or can be arranged in different combinations to provide a variety of improved track assemblies. The foregoing description should therefore be construed to include all those embodiments within the spirit and scope of the following claims.

What is claimed is:

1. An endless track assembly for a vehicle comprising:
   a) a frame including a drive aperture;
   b) first and second suspension arms mounted to pivot from said frame and each supporting an axle;
   c) a plurality of idler wheels mounted to said frame and wherein a first idler wheel is mounted to the axle of said first suspension arm and a second idler wheel is mounted to the axle of said second suspension arm, wherein a linkage arm is coupled between said first and second suspension arms, and wherein a spring is mounted to bias movement of said linkage arm, such that a pivotal movement of either of said first and second idler suspension arms is resiliently opposed or assisted by said spring as the other of said first and second idler wheels attempts to follow;
   d) a drive sprocket mounted to said drive aperture; and
   e) an endless track trained under tension around said drive sprocket and said plurality of idler wheels and exhibiting a longitudinal profile, whereby undulations in the terrain are followed by pivotal rotation of said idler wheels to vary the longitudinal profile, without affecting track tension, to complement the undulations.

2. A track assembly as set forth in claim 1 wherein said spring is mounted in a bore of said frame and wherein an adjuster member abuts said spring to establish a preset compression of said spring.

3. A track assembly as set forth in claim 1 wherein said spring is mounted to said frame and wherein an adjuster member is coupled to said spring to establish a pre-loaded condition of said spring.

4. A track assembly as set forth in claim 1 wherein a housing having an eccentric surface is coupled to said drive sprocket and mounted in said drive aperture such that rotation of said housing in said drive aperture varies the tension of said track.

5. A track assembly as set forth in claim 4 wherein said eccentric housing supports a bearing and is adapted for rotation with a wrench, and wherein a member fastened to said frame secures said housing to said frame to retain a selected rotation of said eccentric housing.

6. A track assembly as set forth in claim 1 including torsion means for biasing said track assembly when mounted to a vehicle to an equilibrium position and limiting the relative rotation of said track assembly to said vehicle to prevent contact therebetween.

7. A track assembly as set forth in claim 6 including a linkage for coupling said torsion means to said vehicle and wherein a first coupler arm includes first and second flanged surfaces that contact first and second surfaces of a second coupler arm to define first and second stop limits and a range of relative rotation of said track assembly to said vehicle.

8. A track assembly as set forth in claim 1 wherein a housing having an eccentric surface is coupled to said drive sprocket and mounted in said drive aperture such that rotation of said housing relative to said drive sprocket varies the tension of said track and including torsion means for biasing said track assembly when mounted to a vehicle to an equilibrium position and limiting the relative rotation of said track assembly to said vehicle to prevent contact therebetween.

9. A track assembly as set forth in claim 1 including an adapter plate that mounts to said drive sprocket and is configured to mount to a plurality of vehicles.

10. A track assembly as set forth in claim 1 wherein said track includes a plurality of outer lugs that project from an interior surface of said track along lateral outer peripheral edges of said track, wherein said lugs include leading and lagging tapered surfaces that collectively exhibit an inverted V-shape as they rise from the interior surface to an apex, and wherein an outer lateral lug surface tapers downward as it descends from said apex surface toward an outer lateral track edge, whereby said outer lugs direct debris upward and outward from an interior space of said track.

11. A track assembly as set forth in claim 1 wherein a circumferential surface of each of said idler wheels include a rubber annulus that contacts an interior surface of said track.

12. A track assembly as set forth in claim 1 wherein a peripheral edge of said drive sprocket exhibits a contoured profile that includes a plurality of radiused reliefs relative to an inverted V-shaped drive channel having a flat apex between adjacent lugs that rise from an interior surface of said track, whereby said sprocket directs debris away from said drive channel.

13. A track assembly as set forth in claim 1 including a coupler housing that couples to a steering member of said vehicle and wherein the housing includes a fastener mounted to said housing to draw said steering member into compression with said housing.

14. An endless track assembly comprising:
   a) a frame including a drive aperture;
   b) first and second and third and fourth suspension arms mounted to pivot from said frame and each supporting an axle;
   c) a plurality of idler wheels, wherein a first pair and a second pair of idler wheels are mounted to the axles of said first and second suspension arms and a third pair and a fourth pair of idler wheels are mounted to the axles of said third and fourth suspension arms, wherein a first linkage arm is coupled between said first and second suspension arms and a second linkage arm is coupled between said third and fourth suspension arms, and wherein first and second springs bias movement of said first and second linkage arms, such that a pivotal movement of either of said first and second suspension arms or either of said third and fourth suspension arms is resiliently opposed or assisted by said first and second springs as the other of said first and second suspension arms or of said third and fourth suspension arms attempts to follow;

d) a drive sprocket mounted to said drive aperture; and e) an endless track trained around said drive sprocket and said plurality of idler wheels and exhibiting a longitudinal profile, whereby undulations in the terrain are followed by pivotal rotation of said idler wheels to vary the longitudinal profile, without affecting track tension, to complement the undulations.

15. A track assembly as set forth in claim 14 wherein an adjuster member is coupled to vary a pre-loaded condition of one of said first and second springs relative to said first and second linkage arms.

16. A track assembly as set forth in claim 14 wherein said first and second linkage arms are each supported to said frame, wherein said first and second springs are mounted in first and second bores of said frame and wherein first and second adjuster members are coupled to said first and second springs to vary a pre-loaded compression of said first and second springs relative to said first and second linkage arms.

17. A track assembly as set forth in claim 14 wherein a housing having an eccentric surface is coupled to said drive sprocket and mounted in said drive aperture such that rotation of said housing relative to said drive sprocket varies the tension of said track.

18. A track assembly as set forth in claim 17 wherein a cap is fastened to said eccentric housing and wherein said cap is adapted to rotate said eccentric housing.

19. A track assembly as set forth in claim 14 including torsion means for biasing said track assembly when mounted to a vehicle to an equilibrium position and limiting a rotation of said track assembly from said equilibrium position to prevent contact with said vehicle.

20. A track assembly as set forth in claim 19 including a linkage for coupling said torsion means to said vehicle and wherein a first coupler arm includes first and second flanged surfaces that contact first and second surfaces of a second coupler arm to define first and second stops and a range of relative rotation of said track assembly to said vehicle.

21. A track assembly as set forth in claim 14 wherein said first and second springs are mounted to said frame and wherein first and second adjuster members threadably coupled to said frame vary a pre-loaded condition of said first and second springs.

22. An endless track assembly comprising:
a) a frame including a drive sprocket and a plurality of idler wheels mounted to said frame;
b) an endless track trained under tension around said drive sprocket and said plurality of idler wheels;
c) a housing coupled to said drive sprocket and mounted to rotate in said frame and wherein said housing has an eccentric surface and rotation of said eccentric surface varies the tension of said track; and
d) a fastener for securing said housing at a selected rotation.

23. A track assembly as set forth in claim 22 wherein said housing supports a bearing, wherein a cap is fastened to said housing and is adapted to rotate said eccentric housing, and wherein a fastener secured to said frame and coupled to said eccentric housing restrains said eccentric housing to said frame.

24. A track assembly as set forth in claim 22 wherein a circumferential surface of each of said idler wheels includes a rubber annulus that contacts an interior surface of said track.

25. An endless track assembly comprising:
a) a frame including a drive sprocket and a plurality of idler wheels mounted to said frame;
b) an endless track trained under tension around said drive sprocket and said plurality of idler wheels;
c) a member having an eccentric surface coupled to said drive sprocket and mounted to rotate at said frame such that rotation of said member varies the tension of said track; and
d) a fastener for securing said member at a selected rotation.

26. An endless track assembly for a vehicle comprising:
a) a frame;
b) first and second suspension arms mounted to pivot from said frame;
c) a first idler wheel mounted to said first suspension arm and a second idler wheel mounted to said second suspension arm, wherein a linkage arm is coupled between said first and second suspension arms, and wherein a spring is mounted to bias movement or said linkage arm, such that a pivotal movement of either of said first and second suspension arms is resiliently opposed or assisted by said spring as the other of first and second suspension arms attempts to follow; and
d) an endless track trained around said first and second idler wheels.

* * * * *